United States Patent [19]
Goldberg

[11] 3,828,234
[45] Aug. 6, 1974

[54] MOTOR SPEED CONTROL SYSTEM

[75] Inventor: Edwin Allen Goldberg, Princeton, N.J.

[73] Assignee: RCA Corporation, New York, N.Y.

[22] Filed: May 14, 1973

[21] Appl. No.: 359,900

[52] U.S. Cl. .............................................. 318/314
[51] Int. Cl. ............................................ H02p 5/16
[58] Field of Search .................... 318/314, 318, 391

[56] References Cited
UNITED STATES PATENTS

| | | | |
|---|---|---|---|
| 3,400,317 | 9/1968 | Thomas | 318/314 |
| 3,462,663 | 8/1969 | Schiller | 318/314 |
| 3,582,541 | 6/1971 | Webb | 318/314 |
| 3,593,075 | 7/1971 | Pantelakis | 318/391 |
| 3,600,508 | 8/1971 | Dann | 318/314 |

*Primary Examiner*—Robert K. Schaefer
*Assistant Examiner*—Thomas Langer
*Attorney, Agent, or Firm*—Edward J. Norton; Joseph D. Lazar; Donald D. Mahoney

[57] ABSTRACT

The speed of a motor is controlled by utilizing an error signal from a phase comparator as the motor energizing source. The phase comparator error signal is a result of a phase comparison between a motor related signal and a reference signal having a phase which varies in a predetermined manner as a function of time.

5 Claims, 3 Drawing Figures

3,828,234

MOTOR SPEED CONTROL SYSTEM

BACKGROUND OF THE INVENTION

1. Field of the Invention

This invention relates to motor speed control systems and, more particularly, to motor speed control systems having a feedback loop.

2. Description of the Prior Art

Methods of controlling the speed of an electric motor by utilizing an error signal, in a motor feedback loop, as a source of motor excitation control are well known in the prior art. The error signal is usually the result of a comparison between an electric signal related to the motor speed and a reference electrical signal, while the frequency of the motor-speed related electric signal is a multiple of the number of revolutions per time unit of the motor shaft, and the phase of that signal is related to the angular position of the motor shaft. In general, the reference electrical signal is at a fixed frequency and phase generated by a suitable oscillator, for example. The frequency and phase of the reference signal is selected to correspond to a desired or chosen motor speed and shaft position. The error signal is a function of the difference in the electrical characteristics existing between the motor-speed related electric signal and the reference electric signal. When the magnitude of the error signal in the motor feedback loop is at a predetermined level, the motor shaft rotates at a speed equal to the desired speed. As soon as the speed of the motor differs from the desired speed, the error signal assumes a magnitude different from the predetermined level and the motor speed is accelerated or slowed accordingly.

In an application where precise control of electric motor speed for driving a solar array in an orbiting spacecraft, such prior art methods and circuits for achieving such methods are not satisfactory for controlling angular shaft displacement with digital precision at extremely slow motor speeds.

SUMMARY OF THE INVENTION

A system is provided for controlling the rotation of a drive means from a reference signal source. The reference signal source is coupled to means responsive to the angular movement of the drive means to provide a first signal. The reference signal is also coupled to phase shifting means responsive to the reference signal for providing an output therefrom. Phase difference determining means responsive to the output of the phase shifting means and the first signal provides a further signal in accordance with the phase difference therebetween. The further signal from the phase difference determining means is applied to the drive means to control the rotational movement of the drive means.

These and other features and advantages of the invention will be better understood from a consideration of the following specification taken in conjunction with the accompanying drawing.

DESCRIPTION OF THE PREFERRED EMBODIMENT

Figure 1:
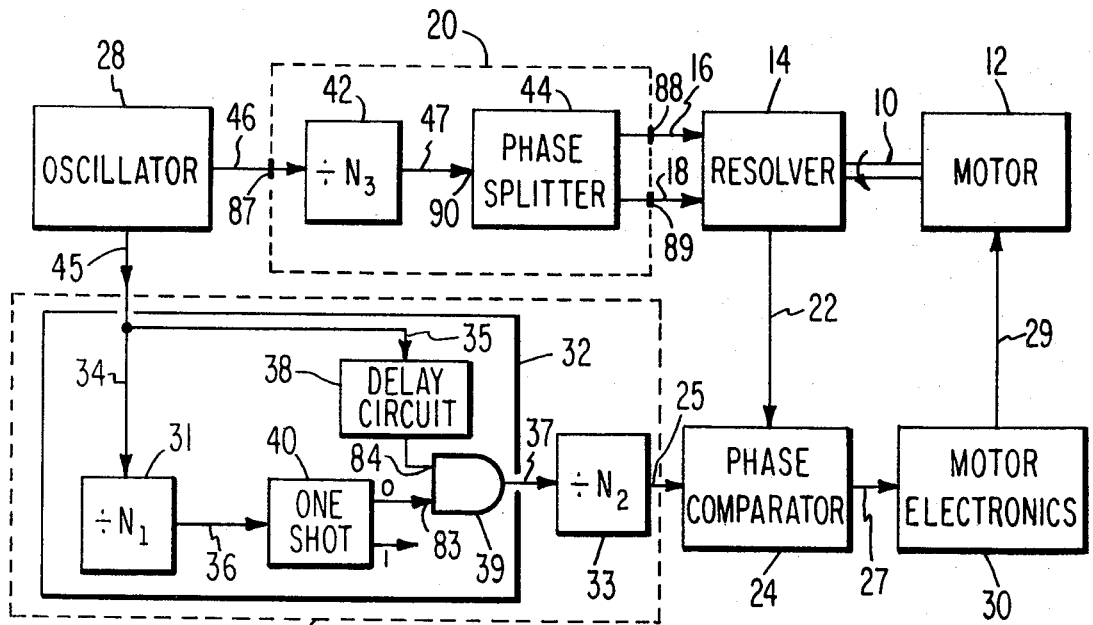
FIG. 1 is a block diagram of an embodiment of the present invention of a motor control system.

Referring to FIG. 1, there is shown a block diagram of a motor control system. The block diagram of FIG. 1 illustrates the concept of the present invention. All ground connections and power supplies and multiple leads coupling the circuit components necessary for proper operation of the elements comprising the block diagram are not shown but will be readily understood by those skilled in the art.

A motor 12 drives a suitable resolver 14 capable of generating an electrical signal over path 22 indicative of the angular position of motor shaft 10. Shaft 10 of motor 12 is directly coupled mechanically to resolver 14 so that the secondary coils, not shown, of resolver 14 rotate at the same speed as motor shaft 10. The primary coils, not shown, of resolver 14 are excited by orthogonal voltage signals transmitted to resolver 14 along conductive paths 16 and 18 from two phase drive system 20. Two phase drive system 20 is arranged to convert an input electrical signal from oscillator 28 to the orthogonal voltage signals used to excite the primary coils of resolver 14. A voltage signal is induced across the secondary coils of resolver 14 due to the excitation of the resolver primary coils. The resolver secondary voltage is transmitted along conductive path 22 to phase comparator circuit 24. The frequency of the resolver secondary voltage signal coupled to phase comparator circuit 24 is the arithmetic sum of the frequency of the signals exciting the primary coils of resolver 14 and a multiple of the number of revolutions per unit of time of the motor shaft. The phase of the resolver secondary voltage signal is a function of the angular position of shaft 10 and the number of poles, P, not shown, of resolver 14 and is referenced to the phase of one of the primary coil excitation voltage signals transmitted by two phase drive system 20.

Phase comparator circuit 24 receives the secondary voltage of resolver 14 and compares it in phase with a reference output voltage transmitted from phase shifting circuit 26 along conductive path 25. Phase shifting circuit 26 is arranged to convert a reference input electrical signal from oscillator 28 to a reference output voltage having a phase which digitally varies in a predetermined manner as a function of time. The phase comparison provided by phase comparator circuit 24 results in an error signal voltage transmitted along conductive path 27 to motor electronics circuit 30. The phase comparator error signal voltage is a function of the phase difference between the resolver secondary voltage and the reference output voltage from phase shifting circuit 26. The phase comparator error signal voltage is amplified and compensated by a suitable motor electronics circuit 30 well known in the art. The motor electronics output signal transmitted along conductive path 29 is used to energize motor 12 which in turn drives resolver 14 in a direction and by an amount necessary to shift the phase of the resolver secondary voltage transmitted along conductive path 22 until it equals a predetermined phase relative to the phase of the reference output voltage from phase shifting network 26.

The phase of the reference output voltage from phase shifting network 26 transmitted along conductive path 25 is not constant, as is usual in prior art circuits, but digitally varies in a predetermined manner as a function of time. Thus, according to the invention, motor 12 is forced to operate and turn shaft 10 at a rate determined by the rate at which the phase of the phase shifter output signal on conductive path 25 is varying relative to the phase of phase splitter output signal on conductive path 16. By incrementally changing the phase of the reference voltage from phase shifting network 26 as a function of time, the motor must correspondingly turn shaft 10 and drive resolver 14 until the magnitude of the error signal voltage is nulled, or until the phase of the resolver secondary voltage on conductive path 22 equals a predetermined phase relative to the phase of the phase shifter output signal on conductive path 25.

An example of a phase shifting network 26 comprises a pulse inhibiter circuit 32 and a suitable frequency divider circuit 33. Inhibiter circuit 32 to be described is formed of a divider 31, one shot 40, delay circuit 38, and AND gate 39. An oscillator generated pulse train repetitive over a period of time at a frequency $f_o$ is conducted from oscillator 28 to phase shifting network 26 over conductive path 45. The oscillator generated pulse train conducted along conductive path 45 is transmitted to first frequency divider 31 along conductive path 34 and to delay circuit 38 along conductive path 35. The output signal from first frequency divider circuit 31 is conducted to a suitable one shot pulse stretcher 40 over conductive path 36 at a frequency $f_o/N_1$ where $f_o$ is the oscillator frequency and $N_1$ is the magnitude of the divisor of first frequency divider circuit 31.

Predetermined pulses in the oscillator generated pulse train conducted to pulse inhibitor 32 along conductive path 45 are periodically inhibited or "snatched" by pulse inhibitor circuit 32. The inhibited pulses are determined by the magnitude of the divisor, $N_1$, of first frequency divider 31. The manner by which the particular operating parameters of each component of the system made in accordance with the invention will be described later. For the present example, pulse inhibitor circuit 32 is arranged to eliminate one pulse per second out of an oscillator generated train of suitably 320,000 pulses per second. Thus, the magnitude of divisor $N_1$ of first frequency divider 31 is 320,000. The pulse inhibitor output pulse train conducted along conductive path 37 to second frequency divider 33 is missing a predetermined number of the oscillator generated pulses transmitted from oscillator 28 to pulse inhibitor circuit 32 along conductive path 45. Second frequency divider 33 acts upon the pulse train conducted along conductive path 37 and transmits, along conductive path 25, an output signal having an electrical phase shift per inhibited pulse, $\phi$, which is determined by the equation:

$$\phi = 360°/N_2 \text{ degrees} \tag{1}$$

where $N_2$ is the magnitude of the divisor of second frequency divider 33. The electrical phase shift per inhibited pulse, $\phi$, is determined relative to the phase of the signal on conductive path 16.

The number of steps or changes in the magnitude of the phase shift of the second frequency divider output signal per time unit is determined by the equation:

$$\dot{\phi} = F_o/N_1 \text{ steps per second} \tag{2}$$

where $N_1$ is the magnitude of the divisor of first frequency divider 31, and $f_o$ is the oscillator 28 frequency. The average phase shift rate, $\Delta\phi/\Delta t$, of the second frequency divider output signal relative to the phase of the signal on conductive path 16 is determined by the equation:

$$\Delta\phi/\Delta t = f_o \times 360/N_1 N_2 \text{ degrees/sec.} \tag{3}$$

where $f_o$ is the oscillator frequency, $N_1$ is the magnitude of the divisor of first frequency divider 31 and $N_2$ is the magnitude of the divisor of second frequency divider 33.

If the oscillator generated pulse train is 320,000 pulses per second, and the magnitude of divisor $N_1$ of first frequency divider 31 is 320,000, a one pulse per second pulse train from first frequency divider circuit 31 is conducted along conductive path 36 to a suitable one-shot pulse stretcher 40 such as a monostable multivibrator. One-shot 40 resides in one state until it is triggered by an input pulse resulting in a change to a second state. After some determinable time duration, independent of the input trigger pulse, one-shot 40 returns to its original state ready to be retriggered by another input pulse.

The input and output signals of logical elements such as one-shot 40 and AND gate 39 are logical voltage levels. In this embodiment, binary number "1" refers to a relatively high voltage level, and the binary number "0" refers to a relatively low voltage level. The magnitude of the voltage levels corresponding to "1" and "0" depend as known in the art on the type of circuits comprising the elements in a system.

The output voltage of one-shot 40 is coupled to input terminal 83 of AND gate 39. The timed delayed oscillator generated pulse train of 320,000 pulses per second output signal from delay circuit 38 is coupled to input terminal 84 of AND gate 39. Delay circuit 38 is a suitable circuit arranged to provide a delay time for the signal coupled to AND gate terminal 84. The magnitude of the delay time provided by circuit 38 is that which is necessary to prevent premature operation of AND gate 39 and is substantially equal to the combined delay time of first frequency divider $N_1$ and one-shot 40.

As known, an AND gate is a logical element which has an output signal value of "1" only when all input signal values are "1". In any AND gate input signal value is "0", the AND gate output signal value is "0". The output level of one-shot 40 is normally "1" and becomes "0" substantially instantaneously when it receives a pulse from divider 31 on lead 36. The duration of the signal level "0" is slightly less than one period of $f_o$, the oscillator frequency. Thus, pulse inhibitor circuit 32 eliminates one pulse per second out of an oscillator generated pulse train of 320,000 pulses per second coupled to input terminal of AND gate 39 when the voltage level on terminal 45 is 1 and the voltage level of the one pulse per second one-shot output signal coupled to input terminal 83 is 0.

The magnitude of divisor $N_2$ of second frequency divider 33 is 32 in order to provide an output signal of 10,000 $H_z$. Therefore, the frequency, $f_1$, of the second frequency divider output signal conducted along conductive path 25 to phase comparator 24 is substantially 10,000 $H_z$. As will be described, 10,000 $H_z$ is substantially the frequency of the phase splitter output signal conducted along conductive paths 16 and 18. The average phase shift rate, $\Delta\phi/\Delta t$, of the second frequency divider output signal is, from equation (3), $$\Delta\phi/\Delta t = 320,000/320,000 \times 360°/32 = 11.25 \text{ degrees/sec.}$$

An example of a suitable two phase drive system 20, for providing a two phase square wave signal, at a frequency of 10,000 $H_z$ conducted along conductive paths 16 and 18 to resolver 14 is a divider 42 coupled to a phase splitter 44. Two phase drive system 20 provides the orthogonal drive signals for resolver 14. The magnitude of divisor $N_3$ of third frequency divider 42 is 8. Thus, the third frequency divider output signal conducted to phase splitter 44 along conductive path 47 is 40,000 pulses per second when an oscillator generated signal of 320,000 pulses per second is conducted along a conductive path 46 to third frequency divider 42.

Figure 2:
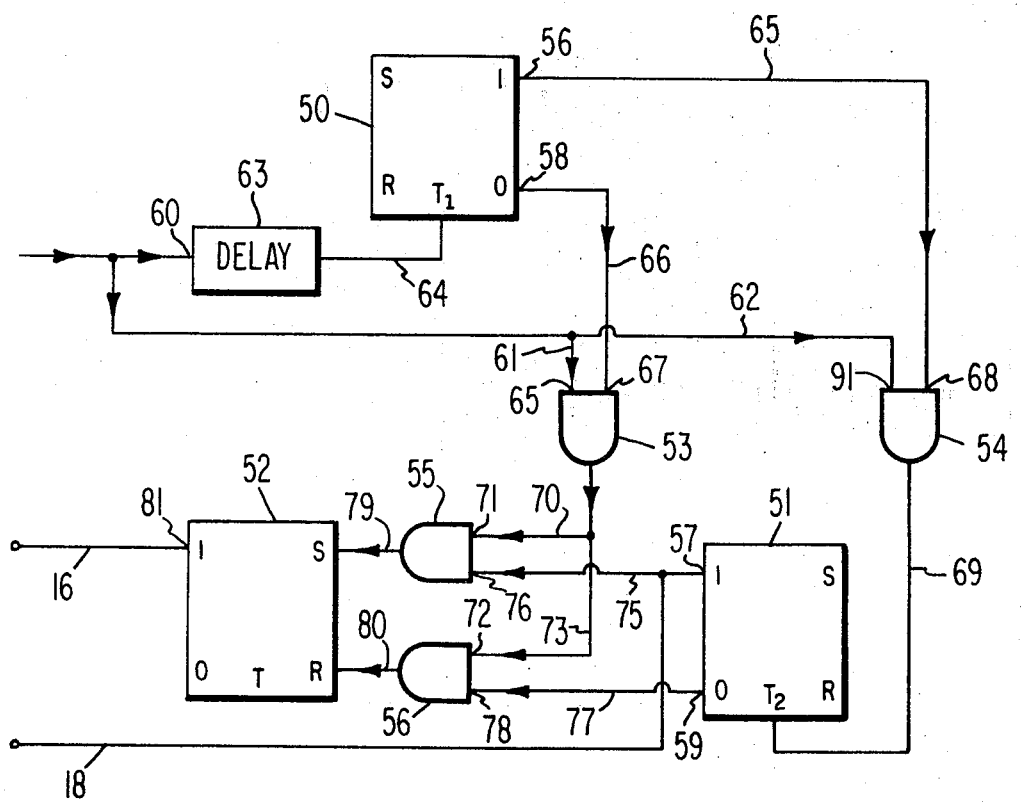
FIG. 2 is a schematic of a phase splitter circuit.

Referring now to FIG. 2, there is shown an example of a suitable phase splitter circuit 44. Phase splitter 44 is an arrangement of suitable flip-flop logic circuits 50, 51 and 52 and suitable AND gate logic circuits 53, 54, 55, and 56 which convert the 40,000 pulse per second single phase signal conducted along conductive path 47 from third frequency divider 42 into two 10,000 pulse per second square wave signals on conductive paths 16 and 18. The signal on conductive path 18 lags the signal on conductive path 16 by one-quarter period of the fundamental frequency of 10,000 $H_z$. Thus, the signals on conductive paths 16 and 18 are in phase quadrature and comprise a two phase system.

More particularly, the phase splitter 44 is arranged so that bistable flip-flop (FF) circuits have two mutually exclusive stable states at their output terminals. A first signal pulse of a pulse train applied to any of the trigger input terminals (T) of the respective bistable flip-flop circuits 50 and 51 results in operating FF 50 and FF 51 in a first state manifesting an output voltage level of "1" from respective output terminals 56 and 57 and an output voltage level of "0" from respective output terminals 58 and 59. A second successive signal pulse of that pulse train on any of trigger input terminals (T) of the respective bistable flip-flop circuits 50 and 51 results in a change from the first circuit state to a second state manifesting an output voltage level of "0" from respective output terminals 56 and 57 and an output voltage level of "1" from respective output terminals 58 and 59.

AND gates 53, 54, 55 and 56 are logic elements in the splitter 44 which have an output signal value of "1" only when all input signal values are "1". If any input signal value is "0", the output signal value is "0".

Logic circuit 52 of the splitter 44 is a set-reset (SR) type flip-flop circuit. A signal pulse on the set input terminal (S) causes FF 52 to assume a stable set state that is maintained until a signal pulse is applied to the reset input terminal (R), causing FF 52 to assume a stable reset state. That is, a signal pulse on the set input terminal (S) results in an output voltage signal value of "1" until a second signal pulse is applied to the reset input terminal (R).

Figure 3:
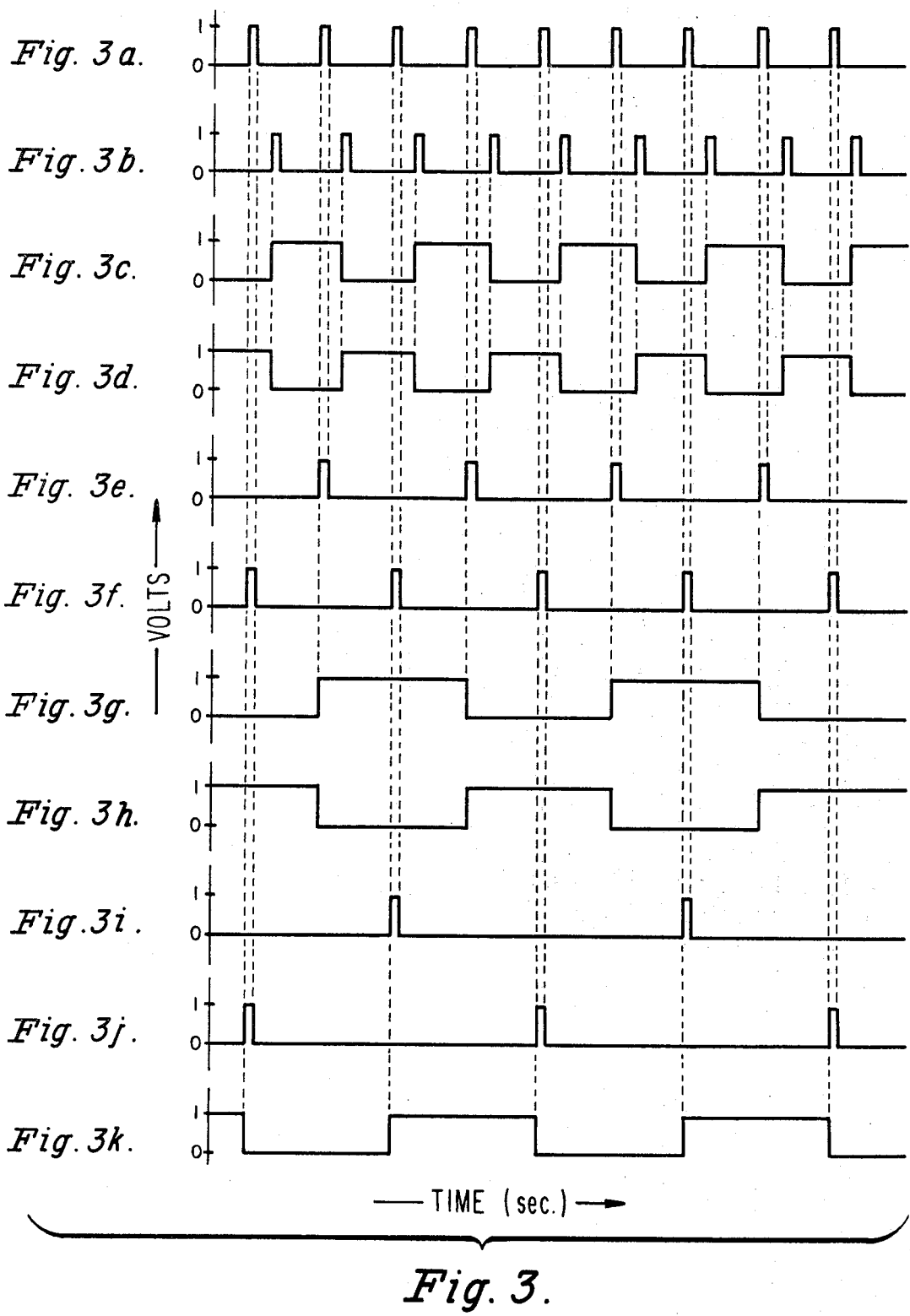
FIG. 3 is a timing diagram graphically illustrating the output signals of each logic circuit comprising the phase splitter circuit of FIG. 2.

Referring now to FIGS. 3a–k, there are shown diagrams graphically illustrating the output signals of each logic circuit comprising phase splitter 44, each diagram related to the same time scale of the other diagrams. FIG. 3a shows the output pulse train from third frequency divider 42 conducted along conductive paths 60 to delay circuit 63, and along conductive paths 61 and 62 to AND gates 53 and 54 respectively.

FIG. 3b shows the time delayed output pulse train from delay circuit 63 conducted along conductive path 64 to trigger input, $T_1$, of flip-flop 50.

FIG. 3c shows the output pulses conducted along conductive path 65 from terminal 56 of circuit 50 to input terminal 68 of AND gate 54. The first time delayed pulse coupled to trigger input, $T_1$, of circuit 50, causes flip-flop 50 to assume a first stable state and an output signal having a voltage level of 1 is conducted from terminal 56 along conductive path 65 until the second time delayed pulse is coupled to trigger input, $T_1$, of circuit 50. The second pulse causes circuit 50 to assume a second state and an output voltage level of "0" is conducted from terminal 56 along conductive path 65 until the third time delayed pulse repeats the process over again.

FIG. 3d shows the output pulses from FF 50 conducted along conductive path 66 from terminal 58 of circuit 50 to input terminal 67 of AND gate 53. During the time period the voltage level of the output signal from terminal 56 of FF 50 is 1, the voltage level of the output signal from terminal 58 of FF 50 is 0. During all other operating time periods of FF 50, the voltage level of the output signal from terminal 58 is 1.

FIG. 3e shows the output pulses from AND gate 54 conducted along conductive path 69 to trigger input $T_2$ of FF 51. The input pulse conducted from terminal 56 of FF 50 to terminal 68 of AND gate 54 is delayed by delay 63 as well as FF 50 relative to the input pulse conducted from third frequency divider 42 to terminal 91 of AND gate 54. The delay 63 is necessary to prevent premature operations of AND gate 54. Delay circuit 63 is arranged to provide the relative delay time for output pulses coupled from terminals 56 and 58 of FF 50.

AND gate 54 output signal pulses have a voltage level of 1 only when the voltage level of both the AND gate 54 input pulses coupled to terminals 91 and 68 are 1. At all other times, AND gate 54 output signal pulses have a voltage level of 0.

FIG. 3f shows output signal pulses from AND gate 53 conducted along conductive path 70 to input terminal 71 of AND gate 55 and along conductive path 73 to input terminal 72 of AND gate 56.

AND gate 53 output signal pulses have a voltage level of 1 only during the time period when the voltage level of both the AND gate 53 input pulses coupled to terminals 65 and 67 are 1. During all other time periods, AND gate 53 output signal pulses have a voltage level of 0.

FIG. 3g shows the output signal pulses from output terminal 57 of FF 51 conducted along conductive path 18 to the primary of resolver 14 and along conductive path 75 to input terminal 76 of AND gate 55.

The first AND gate 54 output pulse coupled to trigger input, $T_2$, of FF 51, causes FF 51 to assume a first stable state and an output signal having a voltage level of 1 is conducted from terminal 57 along conductive paths 74 and 75 until the second AND gate 54 output pulse is coupled to trigger input, $T_2$, of FF 51. The second pulse causes FF 51 to assume a second state and an output voltage level of 0 is conducted from terminal 57 along conductive paths 74 and 75 until the third AND gate 54 output pulse repeats the process.

FIG. 3h shows the output pulses from FF 51 conducted along conductive path 77 from terminal 59 of FF 51 to input terminal 78 of AND gate 56. During the time period the voltage level of the output signal from terminal 57 of FF 51 is 1, the voltage level of the output signal from terminal 59 is 0. During all other operating time periods of circuit 51, the voltage level of the output signal from terminal 59 is 0.

FIG. 3i shows the output pulses from AND gate 55 conducted along conductive path 79 to set input terminal (S) of FF 52.

AND gate 55 output signal pulses have a voltage level of 1 only during the time period when the voltage level of both the AND gate 55 input pulses coupled to terminals 71 and 76 are 1. During all other time periods, AND gate 55 output signal pulses have a voltage level of 0.

FIG. 3j shows the output of AND gate 56 conducted along conductive path 80 to reset input terminal (R) of FF 52.

The output signal pulses of AND gate 56 have a voltage level of 1 only during the time period when the voltage level of both the AND gate 56 input pulses coupled to terminals 72 and 78 are 1. During all other time periods, AND gate 56 output signal pulses have a voltage level of 0.

FIG. 3k shows the output signal pulses of FF 52 conducted along conductive path 16 to the primary of resolver 14. As previously explained, a signal pulse from AND gate 55 coupled to set terminal, S, of FF 52 causes FF 52 to assume a stable set state that is maintained until a signal pulse from AND gate 56 is coupled to reset terminal, R, causing FF 52 to assume a stable reset state.

The output signal coupled from terminal 56 of FF 51 and conducted along conductive path 18 leads by 90° the output signal coupled from terminal 81 of FF 52 and conducted along conductive path 16. This should be readily apparent by a comparison of FIGS. 3g and 3k.

The frequency of the two phase square wave drive signal conducted along conductive paths 16 and 18 from drive system 20 in FIG. 1 to resolver 14 is 10,000 $H_z$ when a pulse train of 40,000 pulses per second is conducted from third frequency divider 42 to phase splitter 44. This relation is deduced from a comparison of FIGS. 3a and 3k.

The magnitude of the frequency division provided by two phase drive system 20, in FIG. 1, for signals conducted from drive system 20 input terminal 87 to drive system 20 output terminals 88 and 89 is equal to the magnitude of the divider $N_2$ of second frequency divider 33, in FIG. 1. In other words, the produc of the magnitude of the divisor $N_3$ of third frequency divider 42 and the magnitude of the frequency division provided by phase splitter 44 equals the magnitude of the divisor $N_2$ of second frequency divider 33. Thus, exemplary phase splitter 44 illustrated in FIG. 2 divides the phase splitter input frequency by 4 and the magnitude of the divisor $N_3$ of third frequency divider 42 is 8 since the magnitude of the divisor $N_2$ of second frequency divider 33 is 32.

Several equations for determining the system operation are now described.

The shaft angle speed, $\dot{\theta}$, of motor shaft 10 is determined by the equation:

$$\dot{\theta} = 720\, f_o/PN_1N_2 \text{ degrees/sec} \qquad 4$$

where $f_o$ is the oscillator frequency in cycles per second, P is the number of resolver poles (not shown), $N_1$ is the magnitude of the divisor of first frequency divider 31 and $N_2$ is the magnitude of the divisor of second frequency divider 33.

The shaft angle incremented motion, $\Delta\theta$, is determined by the equation:

$$\Delta\theta = 720/PN_2 \text{ degrees/step} \qquad 5$$

where P is the number of resolver poles (not shown) and $N_2$ is the magnitude of the divisor of second frequency divider 33.

The number of shaft 10 revolutions over a time period, $\dot{\theta}_m$, is determined by the equation:

$$\dot{\theta}_m = 2\, f_o/PN_1N_2 \text{ revolutions/second} \qquad 6$$

where $f_o$ is the oscillator frequency in cycles per second, P is the number of resolver poles (not shown), $N_1$ is the divisor of frequency divider 31 and $N_2$ is the divisor of frequency divider 33.

Thus, in an example utilizing the invention, a system was designed with the following characteristics:

1. The shaft angle speed, $\dot{\theta}$, of motor shaft 10 is one revolution in 96 minutes or $$\dot{\theta} = 360 \text{ degrees }/96 \text{ minutes} \times 60 \text{ sec/minute} = 0.0625 \text{ degrees/sec}$$

2. Resolver 14 was selected to have 360 poles or P = 360.

3. The desired system stepping rate for motor shaft 10 was 10 steps per second for relatively smooth operation, therefore, the shaft angle incremental motion, $\Delta\theta$, was $$\Delta\theta = (0.0625 \text{ degrees/sec})/(10 \text{ steps/sec}) = 0.00625 \text{ degrees/step}$$

4. Resolver excitation frequency, $F_R$, was selected to be 10,000 $H_z$ or $$F_R = F_o/N_2$$

5. The magnitude of the divisor $N_2$ of second frequency divider 33 computed from equation (5) is $$N_2 = 720/(\Delta\theta)(P) = 720/(0.00625)(360) = 320$$

6. The magnitude of the oscillator frequency, $F_o$, computed from equation (7) is $$F_o = F_R \times N_2 = 10,000 \times 320 = 3.2 \text{ mH}_z$$

7. The magnitude of divisor $N_1$ of first frequency divider 31 is computed from the ratio of equations (4) and (5)

$$\dot{\theta}/\Delta\theta = F_o/N_1 \text{ or}$$

$$N_1 = F_o \times \Delta\theta/\dot{\theta} = 3.2 \times 10^6 \times 0.00625/0.0625 = 320,000$$

A motor speed control system has been described including a specific embodiment using a speed control loop providing high precision control by digital logic circuits of the motor speed. It should be appreciated that the described embodiment using a pulse inhibitor in a time varying phase shifter 26 for an oscillator generated pulse train, and phase splitter 44 comprising logic elements is by way of example. Other elements providing the function of a time varying phase shifter 26 and phase splitter 44 may be used to implement the invention. Thus, many other arrangements can readily be devised in accordance with the disclosed principle of the invention by those skilled in the art.

What is claimed is:

1. In a speed control system having moveable drive means a source of speed reference signals and means connected to said source of reference signals for providing a first electrical signal having a reference phase indicative of the movement of said drive means responsive to said source of speed reference signals, the combination comprising; delay means having an input and output, means for applying said speed reference signals to the input of said delay means, said delay means providing an output signal which is delayed with respect to said input thereof, said output signal also having a predetermined time varying phase relative to said reference phase of said first electrical signal, detecting means responsive to said output signal of said delay means and said first electrical signal to provide an error signal in accordance with a phase difference therebetween, and means applying said error signal to energize said moveable drive means.

2. A system for controlling the rotation of a rotational drive means from a reference signal source, comprising; means coupled to said reference signal source and responsive to the angular movement of said drive means to provide a first signal having a reference phase, phase-shifting means responsive to said reference signal for providing an output signal therefrom, said output signal having a predetermined time varying phase relative to said reference phase, phase difference determining means responsive to the output of said phase shifting means and said first signal to provide a further signal in accordance with the phase difference therebetween, and means for applying to said drive means and further signal to energize said drive means to maintain constant rotational speed.

3. The invention according to claim 2, wherein said reference signal source provides a train of pulses at a given frequency, said phase shifting means includes signal dividing means coupled to said reference signal source to provide a first output therefrom, further means coupled to said reference signal source and responsive to the output of said signal dividing means to inhibit the occurrence of certain ones of said reference pulses as applied to said phase detecting means.

4. Apparatus for controlling the rotational shaft speed of a motor in response to a source of reference pulses, comprising: resolver means having an output, first and second inputs and a shaft directly coupled to said motor shaft; means including phase splitting means responsive to said reference pulses to provide said first and second inputs to said resolver means; a phase detector having an output and first and second inputs thereof; means coupling the output of said phase detector to said motor to control the speed of rotation of said shafts; means coupling the output of said resolver means to said first input of said phase detector; signal dividing means coupled to said source of reference pulses to provide a first pulsed output therefrom; means coupled to the output of said reference pulse source and operative in response to said first pulsed output to periodically inhibit predetermined pulses of said reference pulses from a further pulsed output therefrom, and means for coupling said further pulsed output to said second input of said phase detector.

5. The invention according to claim 4, wherein said second means includes second signal dividing means through which said reference pulses are applied to said phase splitting means; and third signal dividing means responsive to said further pulsed output for modifying said signal as applied to said second input of said phase detector.

* * * * *